US011575680B1

(12) United States Patent
Challey et al.

(10) Patent No.: US 11,575,680 B1
(45) Date of Patent: Feb. 7, 2023

(54) DATA MODELING TO IMPROVE SECURITY

(71) Applicant: Amazon Technologies, Inc., Seattle, WA (US)

(72) Inventors: Darren Whitfield Challey, Grapeview, WA (US); Poojan Tanna, Nashua, NH (US)

(73) Assignee: Amazon Technologies, Inc., Seattle, WA (US)

( * ) Notice: Subject to any disclaimer, the term of this patent is extended or adjusted under 35 U.S.C. 154(b) by 303 days.

(21) Appl. No.: 17/035,358

(22) Filed: Sep. 28, 2020

(51) Int. Cl.
*H04L 9/40* (2022.01)
*G06N 5/04* (2006.01)
*G06N 20/00* (2019.01)

(52) U.S. Cl.
CPC ............ *H04L 63/105* (2013.01); *G06N 5/04* (2013.01); *G06N 20/00* (2019.01); *H04L 63/08* (2013.01)

(58) Field of Classification Search
CPC ......... H04L 63/105; H04L 63/08; G06N 5/04; G06N 20/00
See application file for complete search history.

(56) References Cited

U.S. PATENT DOCUMENTS

| 8,775,206 | B2* | 7/2014 | Kulkarni | G16Z 99/00 705/2 |
|---|---|---|---|---|
| 10,824,702 | B1* | 11/2020 | Shahidzadeh | G06F 21/604 |
| 10,902,705 | B1* | 1/2021 | Rose | H04L 63/0823 |
| 2008/0288330 | A1* | 11/2008 | Hildebrand | G06Q 10/06398 705/7.42 |
| 2018/0124082 | A1* | 5/2018 | Siadati | G06N 5/047 |
| 2019/0089701 | A1* | 3/2019 | Mercury | H04W 4/38 |
| 2020/0285464 | A1* | 9/2020 | Brebner | G06F 11/362 |
| 2021/0174347 | A1* | 6/2021 | Rose | H04L 63/0428 |

* cited by examiner

*Primary Examiner* — El Hadji M Sall
(74) *Attorney, Agent, or Firm* — Kilpatrick Townsend & Stockton LLP

(57) ABSTRACT

Systems and techniques for determining data assessment scores indicative of potential security vulnerabilities and enacting measures to protect sensitive information by controlling permissions and access to sensitive information and systems are provided herein. A data assessment model receives inputs of user access data, user role type, baseline permissions for the user role type, and produces a score. The score is useful for identifying potential security vulnerabilities and enacting proactive security measures to lock down potential vulnerabilities by blocking or changing permissions to reduce risk scores.

20 Claims, 6 Drawing Sheets

DATA MODELING TO IMPROVE SECURITY

BACKGROUND

Network and data security is of paramount concern for enterprise computing environments and systems handling customer or other data. Security vulnerabilities in software are continually discovered, and software updates to correct the vulnerabilities are regularly distributed. Further, harmful software such as viruses, malware, adware, and so on may be inadvertently installed by users. Users may have varying levels of access and power to enact change and preform actions within the network, and the varied levels of access may result in vulnerabilities. Some users may have access to all systems and therefore create potential vulnerabilities if their credentials are compromised. Vulnerabilities within the network security can be difficult to detect when associated with individuals having legitimate (or compromised) permissions or access to systems on the network.

BRIEF DESCRIPTION OF THE DRAWINGS

Various embodiments in accordance with the present disclosure will be described with reference to the drawings, in which.

DETAILED DESCRIPTION

Figure 1:
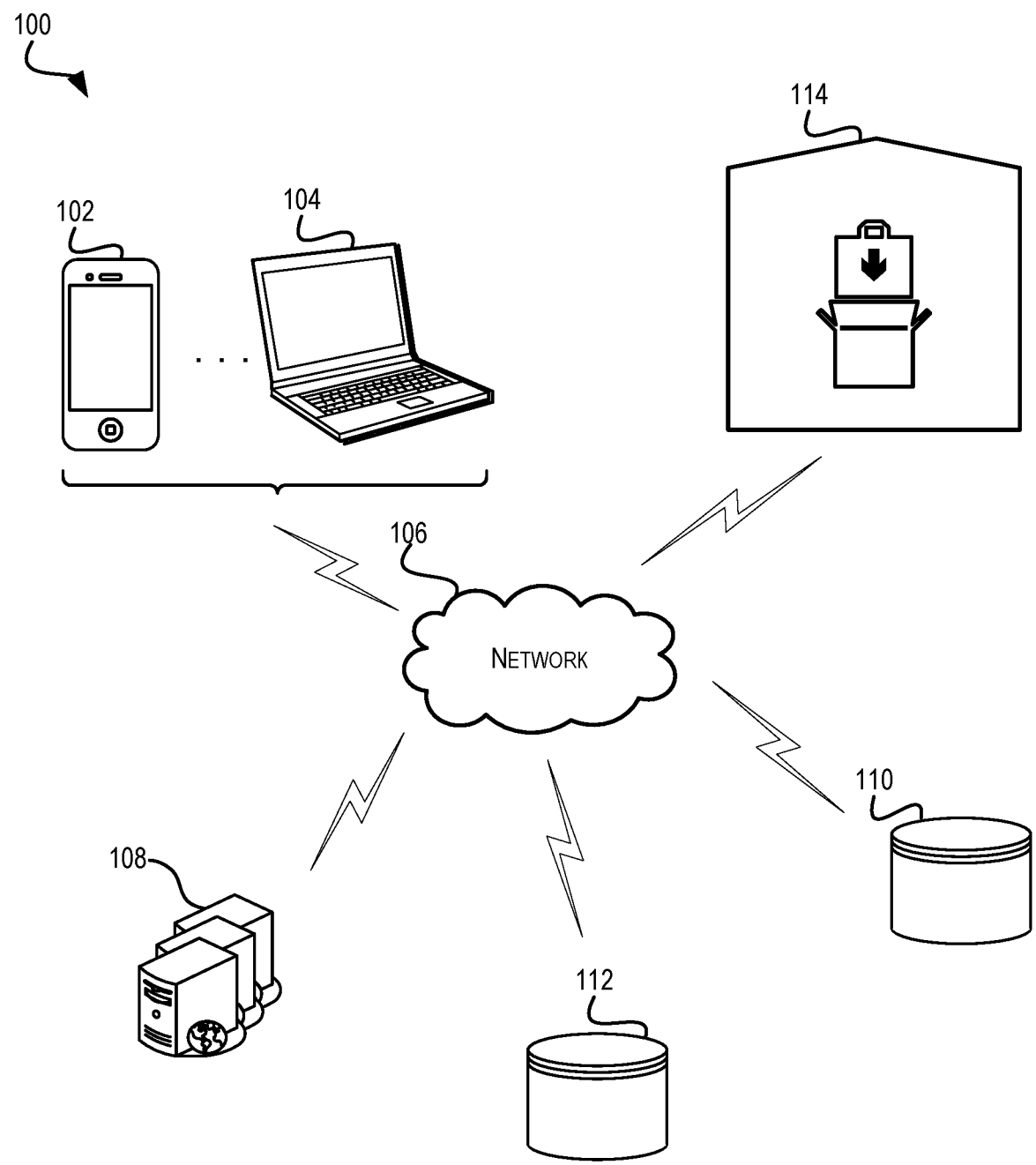
FIG. 1 illustrates an example system diagram for elements of a system for generating an access assessment score, in accordance with at least one embodiment.

Techniques described herein include systems and processes by which data security can be assessed and scored for further action, such as security audits, blocking access, changing user-level permissions, and the like to ensure data and systems of an environment are secured from malicious actors. The systems and techniques described herein provide for real-time generation of scores for one or more users associated with a system or network, such as a workplace environment or distributed network. The systems and techniques described herein reduce potential risk for data compromises and compromises of workplace systems and tools by implementing an automated or semi-automated management plan. The management plan accounts for various attributes and determines an overall score. The overall score may be applied to different systems, users, third-party vendors, or any entity or device connected to the network system. In particular, identifying potential risks to the network provides the best approach to reduce potential security incidents and breaches. The scores generated using the systems and techniques herein provide for simpler, easier, and faster review of security and access permissions and protocols to identify potential security incidents and breaches and take remedial action in advance of a potential security breach.

By way of illustration, one common pattern followed by intruders into a secure system is to gain access through compromised credentials and subsequently increase the privileges, permissions, and access of the compromised account and ultimately expose potentially sensitive data and systems to a breach. The model described herein is able to determine a score for each individual, system, and/or entity connected to a network, such as a workplace network of devices, and use the score to quickly and readily identify outliers. The model is able to identify a velocity of change in access for one or more users to identify adversaries within the environment in addition to other factors that go into the determination of the score. The model enables security audits in or near real-time, for example by providing techniques and systems to continually update or re-calculate scores as changes are made to permissions of accounts.

As an example, consider an employee working in a packaging and shipment center for an e-commerce retailer. The employee has unique identifying information and credentials that grant them access to physical as well as electronic data and systems within the shipment center. The systems and techniques described herein receive inputs including the identifying information for the employee, labor data including a role occupied by the employee (manager, assistant, supervisor, associate, etc.), and data associated with the employee from other systems of the e-commerce retailer including permissions and systems to which the employee has access. Additional inputs into a model may include baseline information, such as average permissions for an employee of the role type held by the employee. The model outputs a score, for example a score between zero and one hundred indicating a risk associated with the employee. The risk may be relative to other employees, for example other employees of the same role type, or may be based on a heuristically determined scale set by subject matter experts and subsequently used to train a machine learning model that ultimately outputs the score. The employee's score is a reflection of potential risk associated with a compromise of that employees credentials. The score may be weighted based on factors such as the types of data accessible to the employee, the number of systems and databases accessible to the employee, read/write permissions, and other such factors. For example, when determining a score, employees who have access to customer identifying information may receive a higher score due to the sensitivity of the data, while employees who may only have access to inventory data may receive a relatively lower score.

In the event of compromised credentials, the systems and techniques herein provide for identification of abnormal behavior, such as escalating permissions for the compromised credentials or other such behavior. The model system, which may operate on a continual basis or on periodic intervals, may identify the change in account permissions that indicate a red flag for potentially compromised credentials. The system may also receive inputs from labor and other workplace systems by which it has access to identify changes in a role type for the employee. Changes in a role, for example by promotion or lateral move within a company may result in significant changes to permissions and access for an employee. The model may account for such changes by not heavily weighting a rapid or sudden change in permissions as heavily when an event such as a promotion or lateral move is determined based on the internal employment data of the company. After detecting the rapid change in permissions, if the change is not associated with a change in role for the employee or is associated with a change other than in the role for the employee, the model may generate a notification including an updated score and potentially instructions to a security department to audit or review the log of systems and data accessed by the employees credentials to identify abnormal behavior and prevent a breach of security or data. In some examples the notification may be presented to a user device for security personnel to review. In some examples the notification may cause systems, such as customer data systems, physical access (such as building access), and machine access to be blocked until the credentials are verified as uncompromised to ensure data and systems are properly protected.

The description included herein provides several improvements over past and conventional systems, including at or near-real-time determination of scores to streamline security review and help prevent data and system breaches. The systems and techniques herein provide for a system to flag suspicious behavior and identify potential security risks as well as flag accounts that may pose a higher risk than warranted given the role of the employee associated with the account. For instance, an employee may have inadvertently been given access to data or systems not required for their particular role that puts that data or those systems at unnecessary risk. The systems described herein provide for identification and evaluation of changes in permissions for users within an environment, the environment potentially including both physical and electronic resources. The systems may identify a velocity of change in permissions and may identify suspicious or unnatural behavior based on the velocity of change in permissions. In an example, a malicious actor may begin to accumulate permissions while gaining access to a system, the techniques described herein identify such behavior based at least on the velocity of changes in permissions and responds accordingly. Such problems are inherent to computing environments and access through the use of computing systems and require a computing solution to handle such problems with typical systems. The systems described herein help identify security risks for companies in real-time that is otherwise not possible through conventional systems and techniques. The systems additionally provide for prioritization of security review, by flagging and prioritizing accounts associated with the highest scores for security audit and additional security protocols or changes in permissions where appropriate. Due to the rapid nature of data and security breaches, especially in instances of breaches of customer data, the systems herein reduce the potential for data breaches by reducing time and hurdles for security review as well as providing for up-to-date and real-time security awareness of employees and systems of the company.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates an example system diagram for elements of a system 100 for generating an access assessment score for accounts associated with a network and/or environment. The system 100 includes one or more user devices 102 and 104, a remote computing device 108, a first database 110, a second database 112, and a warehouse or workplace environment 114. The system 100 includes a network 106 that provides communication between the various elements. The network 106 may be wired or wireless and may include elements such as the internet. In some examples, the network 106 may include any one or a combination of many different types of networks, such as cable networks, the Internet, wireless networks, cellular networks, and other private and/or public networks.

In some examples, the user devices 102 and 104 may perform the functions of the techniques and methods described herein. In some examples, processing of data or some operations may be performed at the remote computing device 108, such as a cloud computing device or remote server. In some examples, processing may be distributed and shared between the user devices 102 and 104 and the remote computing device 108.

An employee, referred to hereinafter as a user, may interact with the user devices 102 and 104 as well as systems within the workplace environment 114 in the course of their regular duties associated with their job. For example the user may interact with one or more systems, such as the first database 110, the second database 112, and the remote computing device 108 to access customer order information, customer data, and address information to process orders for delivery from an e-commerce delivery warehouse.

The first database 110 may include customer data including address information, order information, and other such customer or operating information for operations of the business. The second database 112 may include internal data and storage of internal business information such as employment information, access information, user identities, and the like. In some examples, the first database 110 and the second database 112 may be embodied in a single database or any suitable data structure.

The workplace environment 114 may include numerous systems for operations of the business including physical security systems such as door locks, machines for handling, packaging, or otherwise interacting with goods, shipping systems, and the like. The workplace environment 114 may, for example be a delivery center for an e-commerce retailer. The workplace environment 114 may also be a manufacturing facility, service provider, online service provider, or any other type of entity that provides goods and/or services to customers.

The remote computing device 108 may be a cloud computing device or computing device such as a server that performs one or more operations as described herein. The remote computing device 108 may be an example of a computing device as shown and described with respect to FIG. 2 and FIG. 6 herein. The remote computing device 108 includes instructions stored on a memory to perform operations for the techniques described herein relating to generation of a risk score for entities associated with the system 100. The remote computing device 108 is discussed in further detail with respect to FIG. 2 and provides functions for generating and implementing a risk score. The remote computing device 108 receives data from the first database 110, the second database 112, the workplace environment 114, and the user devices 102 and 104 and uses inputs from those sources into a risk model to generate a risk score and identify potential security risks and take corresponding actions.

Figure 4:
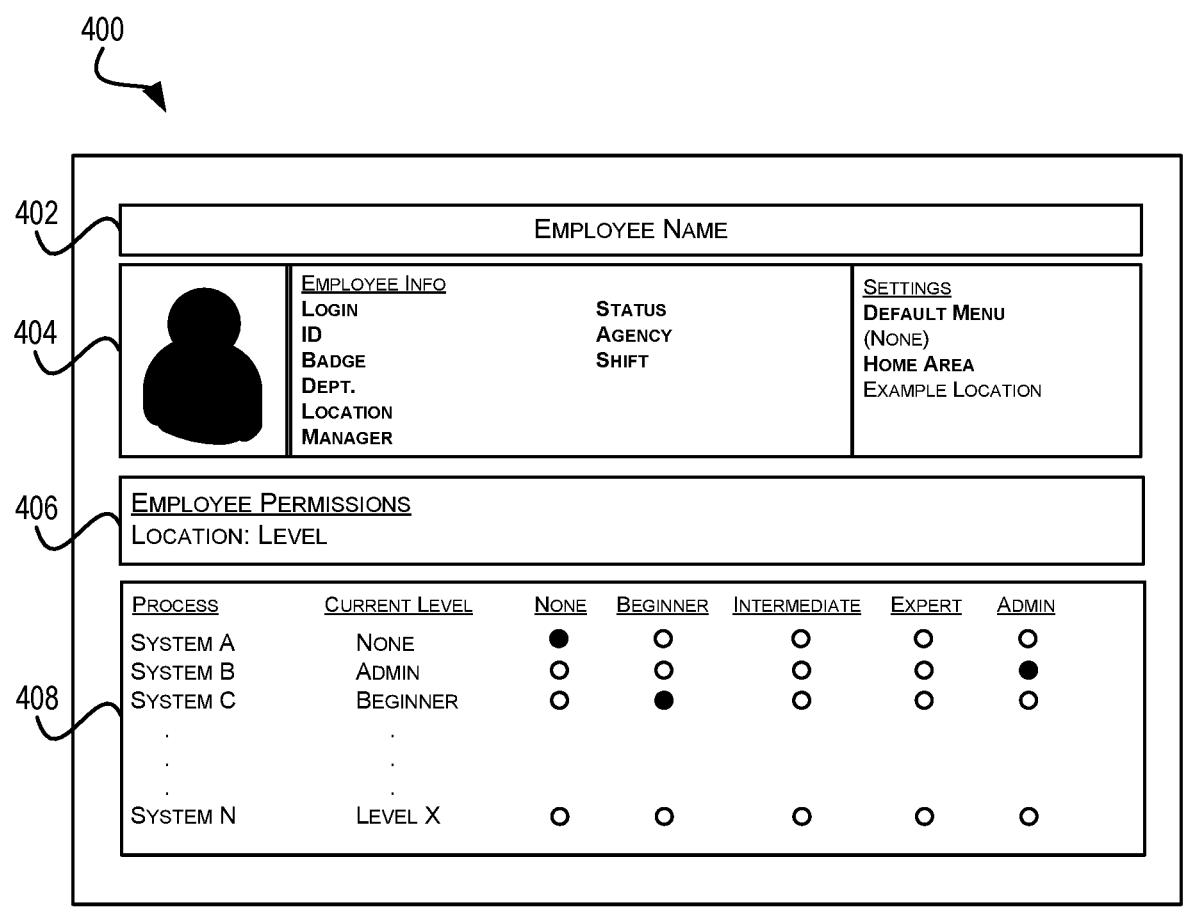
FIG. 4 illustrates an example view of a display of a user device including a graphical user interface (GUI) displaying user permission and access data, in accordance with at least one embodiment.

The remote computing device 108 accesses the first database 110 and the second database 112 to identify information relating to the user, such as permissions granted to the user as described and shown with respect to FIG. 4, as well as business data including customer information. The remote computing device 108 may implement a machine learning engine to generate a risk score based on the class of data accessible to the user, the scope of access the user has, the type of access the user has, as well as the capability of access for the user. Each of these factors may be used to provide weighting factors to determine the risk score. For example, more sensitive classes of data may receive a greater weighting factor as the impact of a breach of such data is much larger than a breach of data of a nonsensitive nature.

The remote computing device 108 may also be configured to provide notifications of risk scores, or flag suspicious behavior, by presenting notifications to user device 102 or 104, which may be associated with security personnel. The remote computing device 108 may also be configured to adjust permissions with respect to particular users, for example by re-writing or altering user permission data stored in the first database 110 to block, either temporarily or permanently, access to data and systems beyond the scope of the role type of the user. In this manner, the remote computing device 108 may take proactive action to mitigate potential security risks. The remote computing device 108 may also interact with one or more systems of the workplace environment 114, for example to block physical access to doors or to systems for which a user is not authorized to use or interact with. This may prevent a user from, for example, using systems and resources of the workplace environment 114 in an unauthorized manner, for example by processing personal shipments through a shipping system or packaging or manufacturing personal items using business resources.

Following generation of the risk scores, and any risk notifications, the remote computing device 108 may output the risk score and risk notification data to store in the first database 110 along with other internal business data. The risk scores and risk notifications may be accessible to security personnel using user devices 102 or 104, for example to perform security audits.

Figure 2:
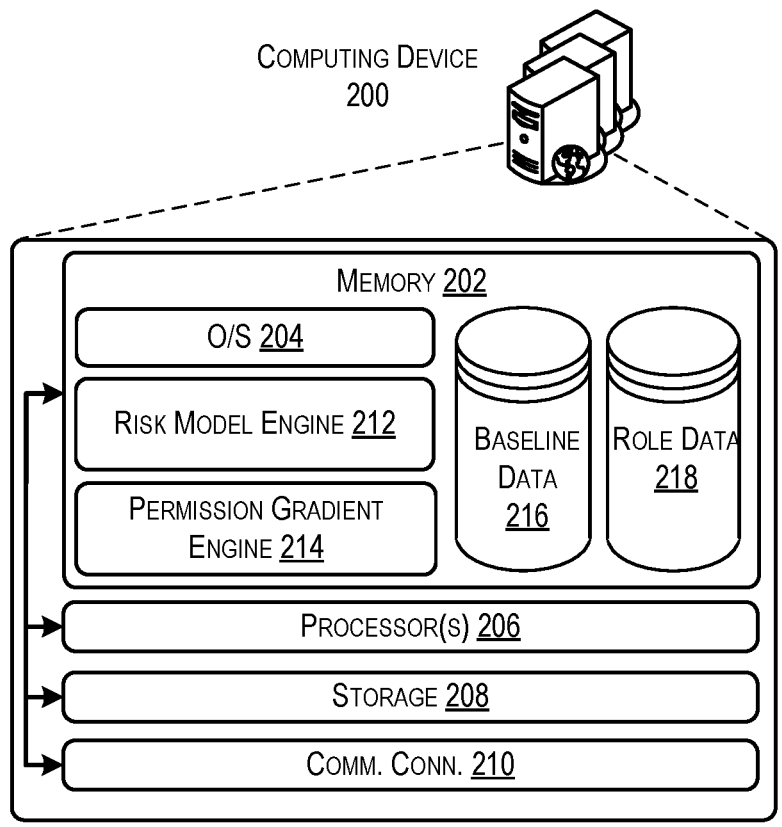
FIG. 2 illustrates an example architecture for implementing an access assessment model, in accordance with at least one embodiment.

FIG. 2 illustrates an example architecture for implementing an access assessment model, in accordance with at least one embodiment. The architecture is shown with respect to computing device 200 and various sub-components thereof. Computing device 200 may be an example of the remote computing device 108 of FIG. 1 and may be an example of a computing device 700 of FIG. 6. The computing device 200 may communicate with one or more other systems, as illustrated with respect to FIG. 1 above. The computing device 200 may also be an example of user device 102 and 104 of FIG. 1.

The one or more computing devices 200 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more computing devices 200 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more computing devices 200 may be in communication with a user device 102 or 104 via the network 106, or via other network connections. The one or more computing devices 200 may include one or more servers, perhaps arranged in a cluster or as individual servers not associated with one another. In embodiments, the one or more computing devices 200 may be in communication with one or more third party computers (not pictured) via networks to receive or otherwise obtain data including customer data, employee data, business data, and other such data handled by systems of the business.

In one illustrative configuration, the one or more computing devices 200 may include at least one memory 202 and one or more processing units or processor(s) 206. The processor(s) 206 may be implemented as appropriate in hardware, computer-executable instructions, firmware, or combination thereof. Computer-executable instruction or firmware implementations of the processor(s) 206 may include computer-executable or machine-executable instructions written in any suitable programming language to perform the various functions described when executed by a hardware computing device, such as a processor. The memory 202 may store program instructions that are loadable and executable on the processor(s) 206, as well as data generated during the execution of these programs. Depending on the configuration and type of the one or more computing device 200, the memory 202 may be volatile (such as RAM) and/or non-volatile (such as ROM, flash memory, etc.). The one or more computing devices 200 may also include additional storage 208, which may include removable storage and/or non-removable storage. The additional storage 208 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 202 may include multiple different types of memory, such as SRAM, DRAM, or ROM.

The memory 202, the additional storage 208, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 202 and the additional storage 208 are all examples of non-transitory computer storage media. Additional types of non-transitory computer storage media that may be present in the one or more computing devices 200 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more computing devices 200. Combinations of any of the above should also be included within the scope of non-transitory computer-readable media.

The one or more computing devices 200 may also contain communication connection interface(s) 210 that allow the one or more computing devices 200 to communicate with a data store, another computing device or server, user terminals, and/or other devices on networks to which the one or more computing devices 200 are connected.

Turning to the contents of the memory 202 in more detail, the memory 202 may include an operating system 204, one or more data stores including baseline data 216 and role data 218 in addition to other data such as the data described with respect to first database 110 and second database 112, and/or one or more application programs or services for implementing the features disclosed herein including the risk model engine 212 and the permission gradient engine 214.

In accordance with at least one embodiment, the risk model engine may be configured to interact with various sub-systems including employment management systems, internal business systems, and the databases of information including the baseline data 216, the role data 218, the first database 110, and the second database 112. The risk model engine 212 may perform operations and tasks as described in further detail with respect to FIG. 3 below. The risk model engine 212 may, for example receive inputs from various systems of the business as well as from the permission gradient engine 214. The risk model engine 212 performs a risk assessment determination based on the inputs and determines an absolute risk score for each user, account, or system. The absolute risk score may be on a scale of zero to one hundred, with increasing numbers indicating increasing levels of risk. The risk model engine 212 may also interact with, or may include sub-systems to perform additional operations following the generation of the risk score. For example, the risk model engine 212 may include a risk notification generator to generate a notification for display at a user device indicating a potential high risk with respect to a particular user or account. The risk model engine 212 may also include an action engine to perform actions such as changing, reducing, or blocking certain permissions and accesses based on a high risk score.

In some examples, the risk model engine 212 may generate the risk notification in response to a determination that the risk score exceeds a threshold. The threshold may be an absolute threshold, for example such that any risk score exceeding fifty results in generation of a risk notification and further actions. The threshold may also be relative to a role type, for example with risk scores of each role type having individual risk score thresholds such that a risk score threshold for generating a notification or taking further action for a manager may be different than a risk score threshold for an assistance manager, project manager, machine operator, or other such role types. In some examples, the risk model engine 212 may aggregate risk scores for a plurality of users and generate a list, such as a ranked list, of high risk accounts for further action and investigation. The list may be ranked based on the absolute risk score output by the risk model engine 212.

The baseline data 216 and the role data 218 may be accessed by the risk model engine 212 for use in generating the risk score. For example, the baseline data 216 may include baseline access and privilege information for particular role types. Certain role types may have common or identical access and privileges. The baseline data 216 may be determined and stored based on an average of privileges and access for users having identical or similar role type classifications, such as managers, operators, assistants, and the like. The baseline data 216 may be determined by a simple average of the access and privileges of each role type. The role data 218 may include the role type classifications as well as expected or actual privileges associated with each role type. In some examples, the role data 218 may also include the present role associated with each user. The baseline data 216 and the role data may be input into the risk model engine 212 to identify outliers and discrepancies, including users with access and privileges at a higher level than their peers.

The risk model engine 212 may additionally identify a high risk associated with accounts having access or privileges well beyond what is expected or typical for such a user based on the baseline data 216 or based on the role type and location of their role type. For example, a user with physical access permission into a warehouse who works remote from that warehouse may be identified as a risk because the scope of the work associated with the role type does not include or require access to the physical resources, such as the warehouse. In this manner, the risk model engine 212 may receive inputs from labor management systems, such as the labor management data 302 of FIG. 3, including human resources, finance, employment, and other such data to identify combinations of privileges or access that appear abnormal or unnatural based on the baseline data 216 or comparison with other workers with similar roles and organizations.

The permission gradient engine 214 may be a sub-system of the risk model engine 212 or may be implemented as a separate system. The permission gradient engine 214 may perform the operations of the gradient model 312 of FIG. 3. The permission gradient engine 214 determines a sudden change in access or privileges. The permission gradient engine 214 may determine a velocity of change in the access or privileges for a particular user. The velocity of change may indicate, for example, that a compromised account is attempting to gain additional privileges and access before the compromise is discovered. The velocity of change of the access or privileges can trigger further actions, for example to flag the account, block the account, or cause the system to take other actions. The velocity of access or privilege change can also be fed into the risk model engine 212 and be used as an input to determine the risk score, for example with a higher risk score associated with a high velocity of change in access or privileges. The permission gradient engine 214 may determine the change by identifying changes in access or permissions that occur over a time interval, for example over a time interval of several minutes, several hours, several days, several weeks, or several months. The permission gradient engine 214 may identify such changes in access or privileges by querying employment data or employee access data, such as stored in first database 110. The permission gradient engine 214 may, in some examples only identify increases in access or privileges or in some examples may identify all changes to access and privileges.

The permission gradient engine 214 may determine changes to access or privileges based on changes in classes of data available to the user, changes in the scope of access, changes in a type of access, and changes in the capability of access. Classes of data may include secure data, private identifying information, unsecured data, nonsensitive data, and any other class of data that may be associated with particular risks, for example with private customer information associated with a high risk while nonsensitive data is associated with a low risk if the data is breached. The scope of access to the data may describe whether the user is able to view all information, only a portion of information, only whether information exists or not, or any other potential variation of access scope that may limit or expand the amount of information visible to the user. The type of access may describe whether the user has administrator access or operating access, such as to operate based on information but not make changes or remove data. The capability of access may include whether the user has read, read/write, write-only, or other such capabilities with respect to data.

Figure 3:
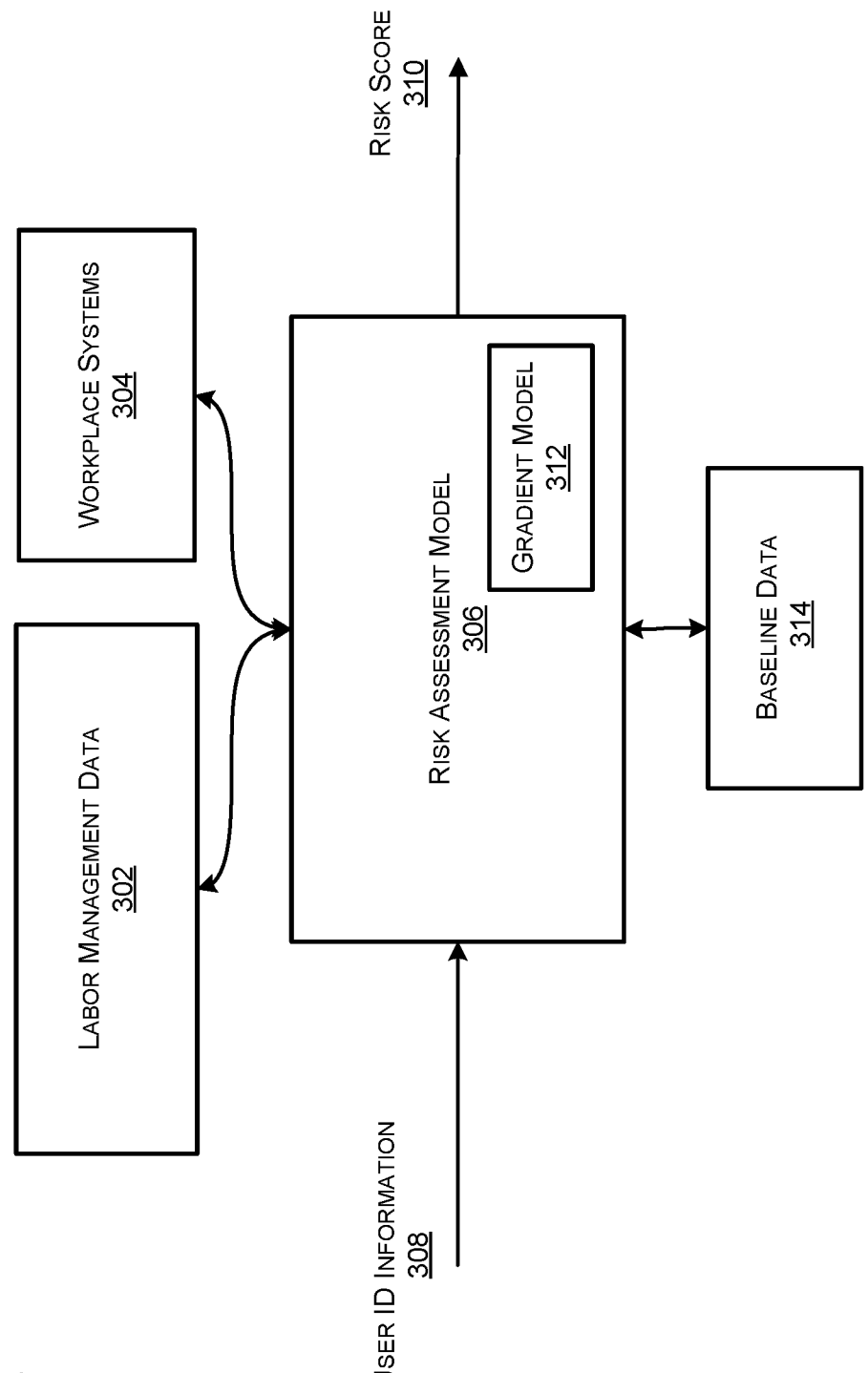
FIG. 3 illustrates an example block diagram representing elements and interactions of an access assessment model, in accordance with at least one embodiment.

FIG. 3 illustrates an example block diagram 300 representing elements and interactions of an access assessment model, in accordance with at least one embodiment. The risk assessment model 306 incorporates inputs from labor management data 302, workplace systems 304, baseline data 314, and user ID information 308 and generates a risk score 310 describing the risk associated with a particular user identified by the user ID information 308. The risk score 310 may be an absolute value in a range of zero to one hundred or any other suitable scale, with higher numbers corresponding to higher levels of risk. This allows for a quantitative comparison between users by the authorized system owner or manager and facilitates a deeper understanding of an individual's overall risk so that the authorized system owner can make better judgements on the appropriateness of access based upon that score.

The labor management data 302 may include data from a central system that includes information related to permissions and access to data and systems within the workplace environment. Each system or database may include permission categories such as none, beginner, intermediate, expert, and admin each associated with varying levels of experience and permission to operate the system or interact with the database at different levels or in different manners. For example, with respect to a particular set of data, admin or expert permissions may include read and write permissions while none or beginner permissions may not include any permissions or may include read only permissions. The labor management data 302 may also include information relating to role types and users associated with each role type as well as data relating to changes in role types over time, for example when a user is promoted. The promotion may result in different permissions for the user.

The baseline data 314 includes baselines for access and permissions for each role type. The range of permissions may be represented as a number value, for example as a number between zero and one hundred, with a higher number indicating greater access and levels of permission. The baseline data 314 is based on an average of access and permission for each role type. The baseline data 314 may identify particular access as well as the types of access granted, such as whether read and write capability exists for a particular user and/or role type.

The workplace systems may include data and information relating to systems within a workplace environment, such as credentials required to access particular systems and data as well as the scope and relative risk associated with exposure of each of the systems to vulnerabilities. For instance, some systems may represent a low risk even if accessed without permissions, such as printers or copy machines. Other systems such as large machinery, customer databases, and the like may include high levels of risk if compromised.

The risk assessment model 306 interacts with the labor management data 302, the workplace systems 304, the baseline data 314, and user ID information 308 to produce the risk score 310. The risk assessment model 306 may include a machine learning model trained using heuristically set risk scores from a training set of data set by subject matter experts. In some examples, the risk assessment model 306 may include discrete rules and weightings set for a variety of factors, such as weightings for varying data classifications, scopes of access, types of access, and capabilities of access. The risk assessment model 306 may include any suitable algorithm for weighing factors from each of the inputs and generating an absolute value reflective of the risk associated with a particular user. The risk assessment model 306 may, in some examples output a ranked list or a subset of a plurality of user ID information 308 identifying users associated with high risk scores without directly outputting a risk score for each. For example, the risk assessment model 306 may output a ranked list of user IDs identifying users whose permissions and access should be audited by a security team or restricted to reduce risks to data protection. The risk assessment model 306 may output a subset of user IDs, in response to a plurality of user IDs being input into the risk assessment model 306, the subset of user IDs including user IDs associated with risk scores or levels of risk above a threshold value.

FIG. 4 illustrates an example view of a display of a user device including a graphical user interface (GUI) 400 displaying user permission and access data, in accordance with at least one embodiment. The GUI 400 displays information related to a user that may be stored in the first database 110, the role data 218, and used by the risk assessment model 306 to generate a risk score 310 as described above.

The GUI 400 includes user ID information 402 including a name or identifier of the user that may be input into the risk assessment model 306 to generate a risk score for the particular user identified by the user ID information 402.

The GUI 400 also includes user-specific information 404 including detailed employment information such as role type, a unique identifier, a department, manager, status, shift, and other such employment information. The user-specific information 404 may also include a work location and tasks assigned.

The GUI 400 also includes employee permissions such as a general permission level 406 associated with a particular work location or role type. For example, a general permission level 406 for a worker within a warehouse may include access to physical door security systems, inventory systems within the warehouse, operating permissions for equipment such as forklifts, and other such permissions.

In addition to the general permission level 406, specific systems and databases may be provided with system level permission 408. Each system may be identified in the list of system level permissions 408 and include information relating to a current permission level as well as options for adjusting the present permission level. In some examples, the permission data from the general permission level 406 and the system level permissions 408 may be used to generate baseline data, such as baseline data 314 of FIG. 3. The risk assessment model may receive inputs including data describing each of the permissions indicated in the GUI 400 and may identify anomalies or abnormalities in the permissions, such as permissions that a particular user may have admin privileges while the role type baseline data indicates that the user would typically have beginner permissions.

In some examples, the risk assessment model and/or the risk assessment engine may configure permissions of the general permission level 406 and/or the system level permissions 408 based on risk scores exceeding a threshold, indicating an unacceptably high level of risk for the user to have such permissions.

Figure 5:
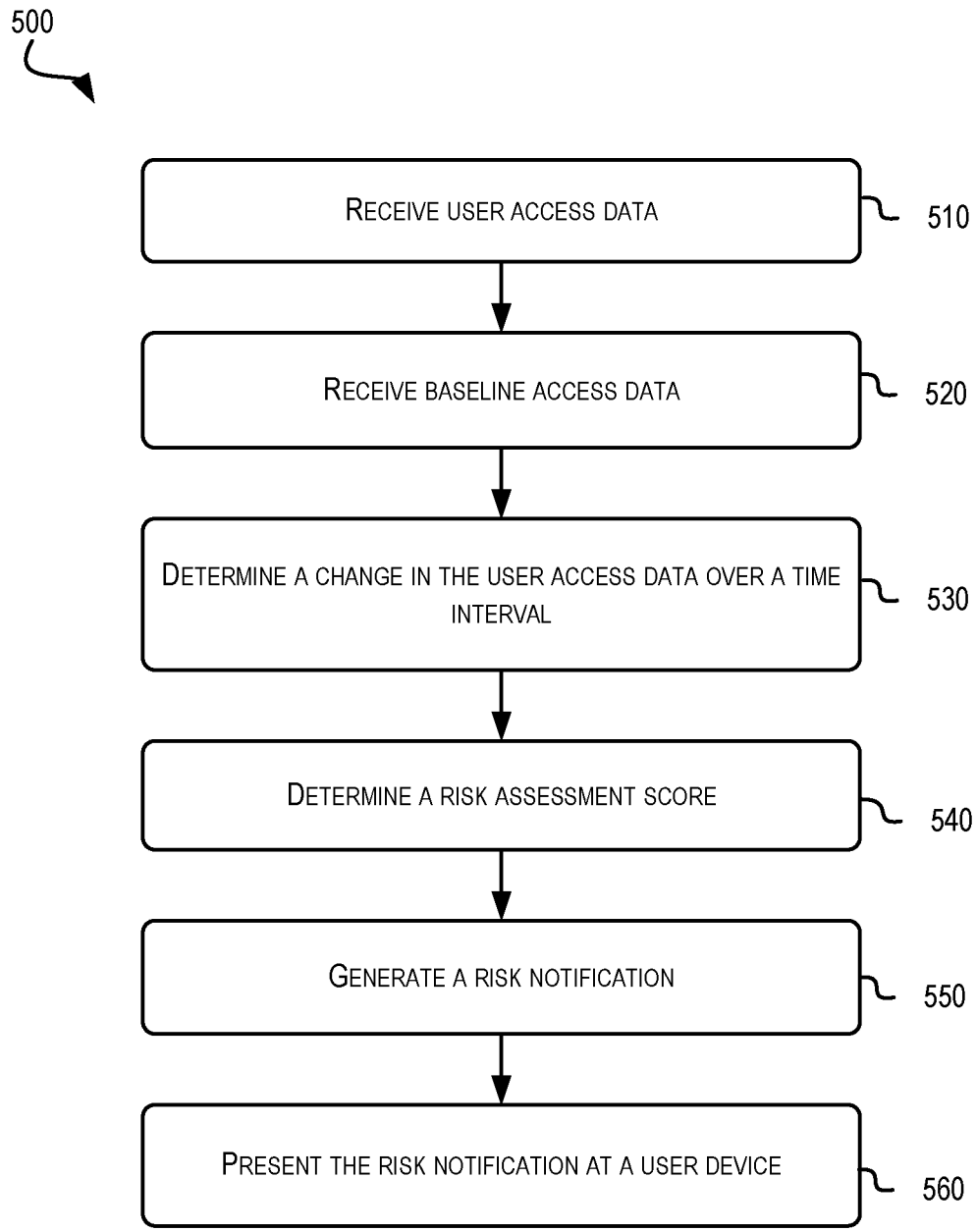
FIG. 5 illustrates an example flow diagram for an access assessment model, in accordance with at least one embodiment.

FIG. 5 illustrates an example flow diagram for an access assessment model, in accordance with at least one embodiment. Some or all of the process 500 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At 510, the process 500 includes receiving user access data. The user access data may describe account permissions associated with a role type. In some examples, the user access data may include the particular permissions assigned to a user including general permissions as well as system level permissions as described with respect to FIG. 4. The user access data may also include access logs and information relating to systems and data accessed by a particular user over a time interval. The user access data described permissions for a user associated with the user access data to interact with one or more systems including physical systems as well as databases and computing resources in a work environment.

At 520, the process 500 includes receiving baseline access data. The baseline access data is associated with a role type. The role type is associated with the user for which the user access data was received. The baseline access data is determined based at least in part on responsibilities and average permissions assigned to complete the responsibilities assigned to the role type. In some examples, the baseline access data is determined by averaging permissions assigned to various users having the same or similar role types.

At 530, the process 500 includes determining a change in the user access data over a time interval. The change in user access data may be determined by accessing or receiving role data including changes to role data over time, such as with respect to promotions or changes in responsibilities and tasks for a user. The change in user access data over the time interval may be associated with or independent of changes in role type for a particular user. In some examples, the change in user access data may only be determined or identified for use by the risk assessment model when the role type is constant over the time interval yet the user access data changes. In some examples, only increase in permissions within the user access data may be included in the change to the user access data input into the risk assessment model.

At 540, the process 500 includes determining a risk assessment score. In some examples determining the risk assessment score may include training a machine learning model using historical risk assessment score data. The machine learning model may be an example of the risk model engine 212 of FIG. 2. The machine learning model may receive inputs including user access data, which may include the role data 218 as well as data from the labor management data 302, in addition to the role data, and the baseline access data. The machine learning model outputs a risk assessment score for a particular user. In some examples, the machine learning model may output a ranked list of identified accounts at high risk, for example including accounts for which the risk score exceeds a threshold.

At 550, the process 500 includes generating a risk notification. The risk notification may include the risk score in addition to major contributing factors that resulted in the high risk score. For example, the risk notification may include information describing which anomalies or permissions are abnormal for a particular user or raised a flag with the risk assessment model. The risk notification may include the ranked list developed at 540 and may be generated as an audit list for use in protecting the most vulnerable security risks within the system. The risk notification may include instructions for one or more computing systems to change or block user access to one or more systems in order to reduce the risk score for the user. For example, the major contributing factor may be identified as abnormal access to a database including sensitive customer data that may not be required for a particular role type. The instructions may, in this example, cause the one or more computing devices to block access to the sensitive customer data for the user to reduce the potential risk. In some examples, the risk assessment model may include a feedback loop for iterating on generating risk scores to reduce risk scores below a threshold level by setting permissions and blocking access until a risk score produced in response to changing such permissions is below a threshold level. For example, the risk assessment model may include a projection component capable of iterating the determination of risk score and adjusting parameters for inputs to simulate changes in permissions and output recommended changes to permissions to lower the risk score below a threshold level.

At 560, the process 500 includes presenting the risk notification at a user device. The risk notification may be output to a user device to notify one or more security personnel and/or to implement changes by outputting the risk notification to one or more computing devices configured to proactively block or change permission levels in response to identification of high risk scores and major contributing factors that resulted in the high risk scores.

In some examples, the process 500 may include additional actions subsequent to and based on the risk score and/or the risk notification. The risk notification may include instructions or may cause a computing device to prevent further access to the account associated with the risk score, blocking access until the credentials can be secured and the account verified. The risk notification may recommend reductions or changes to permission levels to reduce the risk score, as described above. Additionally, in response to the risk score, for example when the risk score exceeds a threshold value, the risk notification may include instructions or cause a computing device, such as the computing device 200 to generate an authentication request. The authentication request may be conveyed to the user via a user device and include data or a request for data from the user to verify the user's identity and security. In some examples this may include two-factor authentication requests, security questions, passcodes, passphrases, and other such unique information known or accessible by the user to verify their identity and secure the account.

In some examples, the process 500 may include further actions based on the risk score. The actions may include evaluating, or instructing a security team or system to investigate and evaluate actions, behavior, and permissions for the account based on the risk score. The actions may include notifying administrators of the system, a supervisor, or manager, and instructing investigation or further action to authenticate the identity and the actions of the individual with respect to permissions associated with their account. This may involve updating one or more privileges of the user account based on the risk score. For example, after identifying a user account with a risk score above the threshold, a supervisory user or system may be notified and may subsequently update the privileges of the user. The change in privileges may be based on reducing the risk score, reducing unnatural combinations of privileges, or otherwise adjusting the privileges to lower the risk score associated with the account and address the potential security issue. Additional actions may include monitoring of behavior associated with the account, logging actions taken and performed as well as systems (physical and electronic) interacted with. During this monitoring, or following identification of an account with a high risk score, sensitive data, information, or systems may be locked from access by the account.

Figure 6:
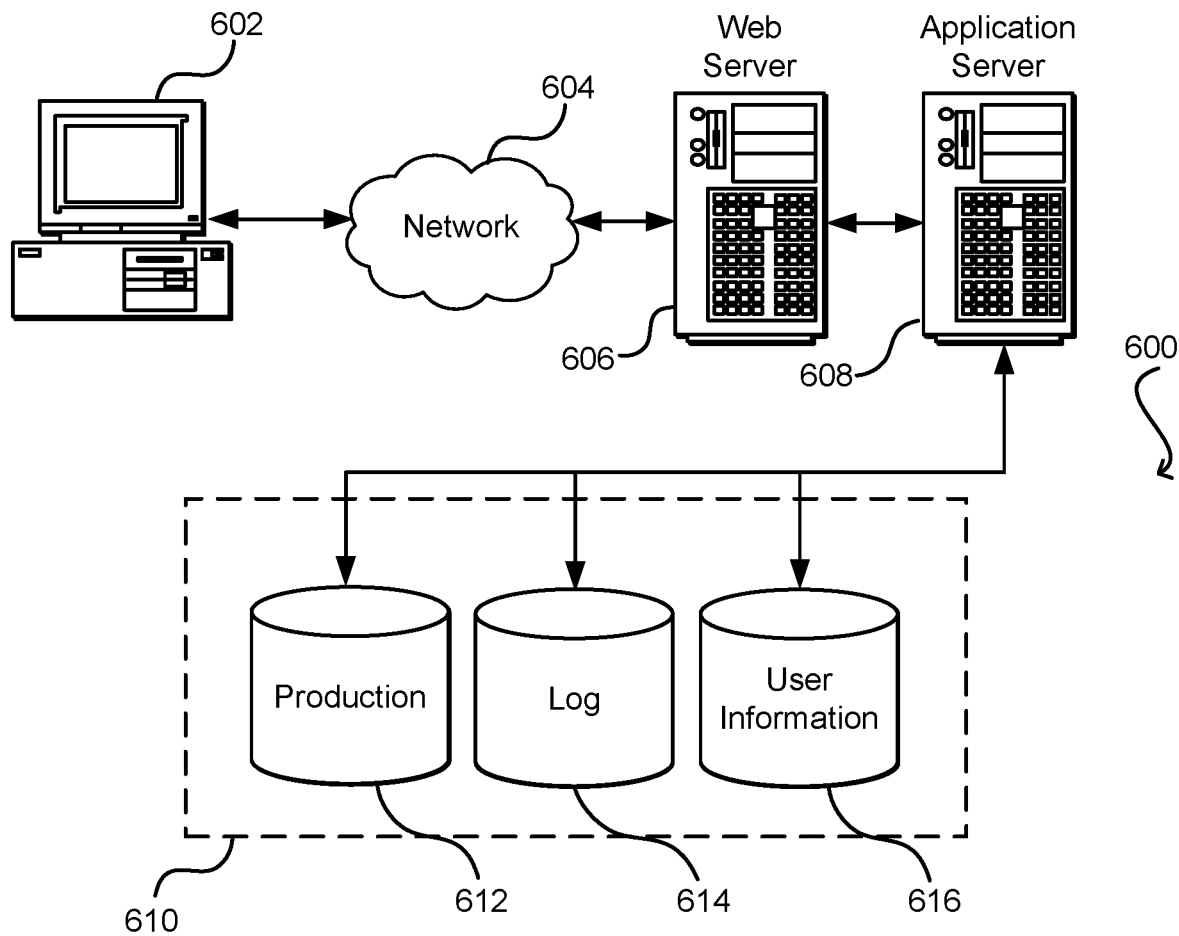
FIG. 6 illustrates an environment in which various embodiments can be implemented.

FIG. 6 illustrates aspects of an example environment 600 for implementing aspects in accordance with various embodiments. As will be appreciated, although a Web-based environment is used for purposes of explanation, different environments may be used, as appropriate, to implement various embodiments. The environment includes a client device 602, which can include any appropriate device operable to send and receive requests, messages, or information over an appropriate network 604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 602 and the application server 608, can be handled by the Web server. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log data 614, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 602. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the example environment 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving user access data describing permission to interact with one or more systems associated with a work environment;
    receiving baseline access data describing baseline access for a role type associated with the work environment, the baseline access for the role type determined based at least in part on responsibilities for entities associated with the role type;
    receiving role data describing changes to the role type over time;
    determining, based at least in part on the role data, a change in the user access data over a time interval that is associated with changes other than the changes to the role type;
    training a machine learning model using historical score data, the machine learning model receiving inputs of the user access data, the role data, and the baseline access data;
    receiving, as output from the machine learning model, a score;
    determining whether the score exceeds a threshold;
    generating a notification in accordance with the score exceeding the threshold;
    presenting the notification to a supervisory user at a user device within the work environment; and
    generating an authentication request, by the supervisory user, in accordance with the score exceeding the threshold, the authentication request requesting authentication data from a user via the user device.

2. The computer-implemented method of claim 1, wherein the baseline access comprises an average of user accesses for a plurality of users associated with the role type.

3. The computer-implemented method of claim 1, further comprising:
    receiving score data for a plurality of users associated with the role type; and
    determining an average for the score data, and wherein generating the notification comprises generating the notification for each of a subset of the plurality of users in response to the score data for the subset of the plurality of users exceeding the average by more than a second threshold.

4. The computer-implemented method of claim 1, further comprising blocking permissions to one or more systems in response to the notification.

5. A computer-implemented method, comprising:
    receiving user access data describing account permissions associated with a role type;
    receiving baseline access data describing baseline access for the role type;
    determining a change in the user access data over a time interval, wherein the role type is constant over the time interval;
    determining a score based at least in part on the user access data, the change in the user access data, and the baseline access data; and
    generating a notification in response to the score exceeding a threshold, the notification comprising the score and instructions to audit the account permissions; and
    presenting the notification at a user device.

6. The computer-implemented method of claim 5, further comprising blocking permission changing the user access data to block permission to one or more systems in response to generating the notification.

7. The computer-implemented method of claim 5, wherein determining the score comprises:
    comparing the user access data to the baseline access data; and
    increasing the score in response to the user access data exceeding the baseline access data.

8. The computer-implemented method of claim 5, wherein determining the score comprises increasing the score in response to determining an increase in the user access data is associated with a change other than a change in the role type.

9. The computer-implemented method of claim 5, wherein determining the score comprises inputting the user access data, the change in user access data, and the baseline access data into a machine learning algorithm trained using historical score data.

10. The computer-implemented method of claim 5, further comprising receiving score data for a plurality of users, and wherein the notification comprises instructions instructing further data protection measures in response to determining a subset of the score data exceeds a second threshold.

11. The computer-implemented method of claim 5, further comprising:
    receiving score data for a plurality of users associated with the role type; and
    determining an average for the score data, and wherein generating the notification comprises generating the notification for each of a subset of the plurality of users in response to the score data for the subset of the plurality of users exceeding the average by more than a second threshold.

12. The computer-implemented method of claim 5, wherein determining the score is further based at least in part on user role data describing one or more role types assigned to a user over time.

13. The computer-implemented method of claim 12, wherein determining the score based at least in part on the user role data and the change in the user access data comprises increasing the score in response to determining an increase in the user access data is not associated with a change in the user role data.

14. A non-transitory computer-readable storage medium storing computer-executable instructions that, when executed by a computer system, configure the computer system to perform operations comprising:
    receiving user access data describing account permissions associated with a role type;
    receiving baseline access data describing baseline access for the role type;

determining a change in the user access data over a time interval that is associated with changes other than changes to the role type;

determining a score based at least in part on the user access data, the change in the user access data, and the baseline access data;

generating a notification in response to the score exceeding a threshold, the notification comprising the score and instructions to audit the account permissions; and presenting the notification at a user device.

15. The non-transitory computer-readable storage medium of claim 14, wherein the instructions comprise further instructions that, when executed by the computer system, configure the computer system to perform additional operations comprising changing the user access data for a user associated with the user access data to block permission to one or more systems in response to generating the notification.

16. The non-transitory computer-readable storage medium of claim 14, wherein the instructions comprise further instructions that, when executed by the computer system, configure the computer system to perform additional operations comprising blocking physical access to one or more workplace environments in response to generating the notification.

17. The non-transitory computer-readable storage medium of claim 14, wherein determining the score comprises inputting the user access data, the change in user access data, and the baseline access data into a machine learning algorithm trained using historical score data.

18. The non-transitory computer-readable storage medium of claim 14, wherein determining the score comprises increasing the score in response to determining an increase in the user access data is associated with a change other than a change in role type.

19. The non-transitory computer-readable storage medium of claim 14, wherein the instructions comprise further instructions that, when executed by the computer system, configure the computer system to perform additional operations comprising:

receiving score data for a plurality of users associated with the role type;

determining an average for the score data; and generating a second notification for a subset of the plurality of users in response to the score data for the subset of the plurality of users exceeding the average by more than a second threshold.

20. The non-transitory computer-readable storage medium of claim 14, wherein the instructions comprise further instructions that, when executed by the computer system, configure the computer system to perform additional operations comprising:

receiving score data for a plurality of users; and generating a second notification instructing further data protection measures in response to determining a subset of the score data exceeds a second threshold.

* * * * *